United States Patent
Burritt et al.

(10) Patent No.: US 7,079,628 B1
(45) Date of Patent: Jul. 18, 2006

(54) APPARATUS AND METHOD FOR CONVERTING TEXT BEING STREAMED TO A DISPLAY OF TELECOMMUNICATION TERMINAL

(75) Inventors: David Ray Burritt, Broomfield, CO (US); Paul Roller Michaelis, Louisville, CO (US); Matthew Jerome Stevens, Thornton, CO (US); Roger Leon Toennis, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/931,684

(22) Filed: Sep. 1, 2004

Related U.S. Application Data

(63) Continuation-in-part of application No. 10/251,249, filed on Sep. 20, 2002, and a continuation-in-part of application No. 10/406,341, filed on Apr. 3, 2003, and a continuation-in-part of application No. 10/671,925, filed on Sep. 24, 2003, and a continuation-in-part of application No. 10/371,639, filed on Feb. 21, 2003, and a continuation-in-part of application No. 10/799,423, filed on Mar. 12, 2004.

(51) Int. Cl.
*H04M 11/00* (2006.01)

(52) U.S. Cl. .................. 379/52; 379/90.01; 370/352
(58) Field of Classification Search ............... 379/52, 379/93.15, 90.01; 370/352; 704/271, 277
See application file for complete search history.

(56) References Cited

U.S. PATENT DOCUMENTS

| 6,421,425 | B1 * | 7/2002 | Bossi et al. ................. 379/52 |
| 6,950,501 | B1 * | 9/2005 | Chaturvedi et al. ......... 379/52 |
| 2002/0057765 | A1 * | 5/2002 | Hyziak et al. ............... 379/52 |
| 2005/0094775 | A1 * | 5/2005 | Smith et al. ................. 379/52 |
| 2005/0094776 | A1 * | 5/2005 | Haldemann et al. ......... 379/52 |

* cited by examiner

*Primary Examiner*—Stella Woo
(74) *Attorney, Agent, or Firm*—John C. Moran

(57) ABSTRACT

An apparatus and method convert streaming text to a display of a telecommunication terminal to audio by detecting the streaming text being transmitted to the digital display and performing the conversion. Another embodiment converts text in one language directed to a display of a telecommunication terminal to text of another language and displays the resulting text on the display of the telecommunication terminal.

48 Claims, 13 Drawing Sheets

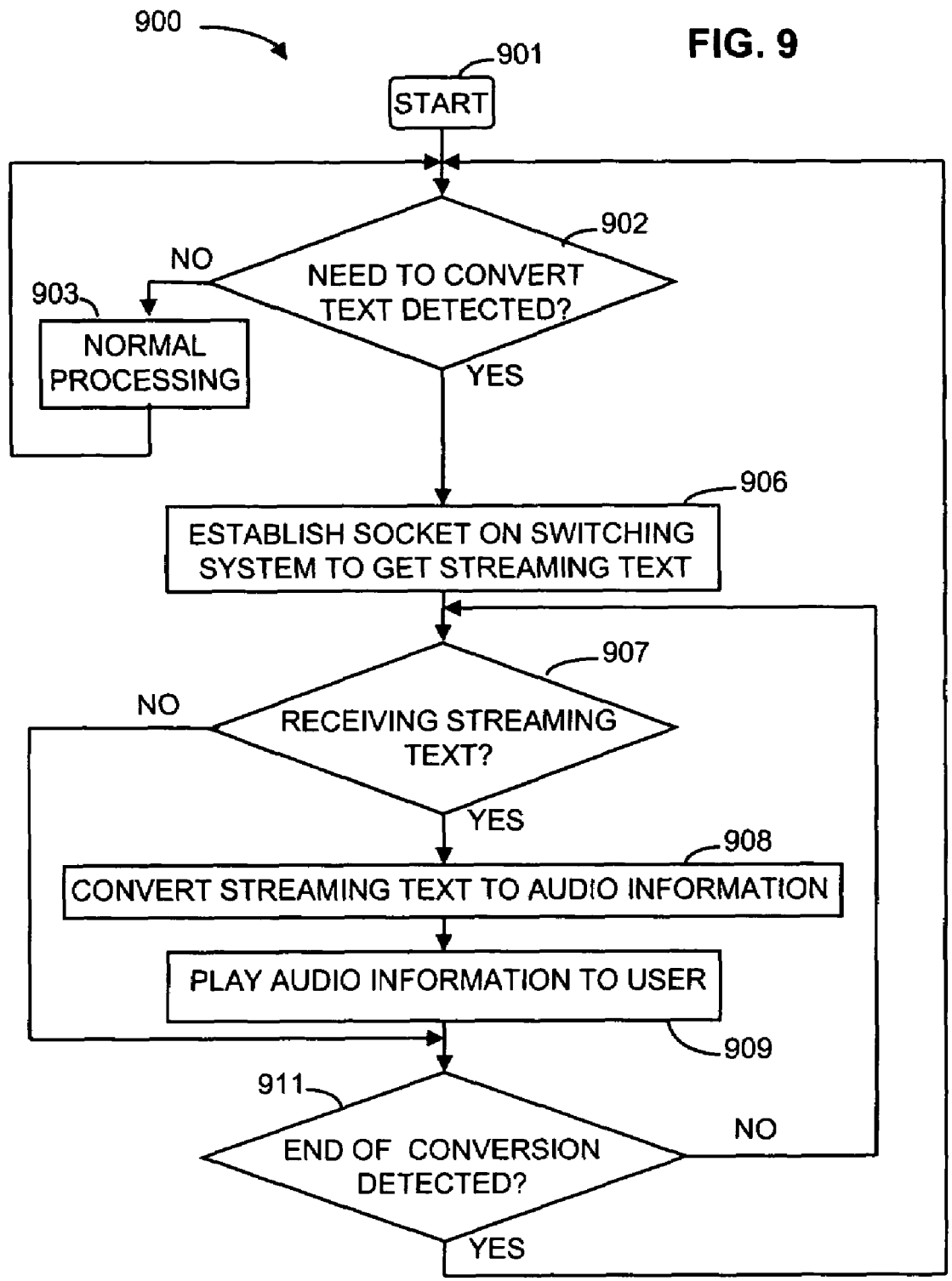

APPARATUS AND METHOD FOR CONVERTING TEXT BEING STREAMED TO A DISPLAY OF TELECOMMUNICATION TERMINAL

CROSS REFERENCE TO RELATED APPLICATIONS

This patent application is a Continuation In Part of U.S. patent application Ser. No. 10/251,249, filed on Sep. 20, 2002, U.S. patent application Ser. No. 10/406,341, filed on Apr. 3, 2003, U.S. patent application Ser. No. 10/671,925, filed on Sep. 24, 2003, U.S. patent application Ser. No. 10/371,639, filed on Feb. 21, 2003, and U.S. patent application Ser. No. 10/799,423, filed on Mar. 12, 2004; and all assigned to the same assignee as the present application. U.S. patent application Ser. No. 10/251,249, U.S. patent application Ser. No. 10/406,341, U.S. patent application Ser. No. 10/671,925, U.S. patent application Ser. No. 10/371, 639, and U.S. patent application Ser. No. 10/799,423 are hereby incorporated by reference.

TECHNICAL FIELD

This invention relates to telecommunication systems and methods in general, and in particular, to the control of telecommunication calls involving TTY and other text streaming transmissions.

BACKGROUND OF THE INVENTION

TTYs (also known as TDDs) are text terminals that people with speaking and hearing impairments use in order to communicate over telephone lines. In the United States, the most commonly used TTY communication protocol is the technique specified by ANSI/TIA/EIA 825 ("A 45.45 Baud FSK Modem"). Relevant characteristics of this protocol include the following:

(1) TTYs are silent when not transmitting. Unlike fax machines and computer modems, TTYs have no "handshake" procedure at the start of a call, nor do they have a carrier tone during the call. Although this approach tends to limit the speed of transmission, it has the advantage of permitting TTY tones, DTMF (Dual Tone Multi-Frequency signals, also known as "touch tones"), and voice to be intermixed on the same call.

(2) Operation is "half duplex." TTY users must take turns transmitting, and typically cannot interrupt each other. If both people try to type at the same time, their TTYs will show no text at all, or will show text that is gibberish. There is no automatic mechanism that lets TTY users know when a character they have typed correctly has been received incorrectly. To avoid this problem, a user normally types a message and then types "GA" (for go ahead). This does solve the problem of half duplex operation but results in a slow, jerky operation which tends to limit spontaneous interaction.

(3) Each TTY character consists of a sequence of seven individual tones. The first tone is always a "start tone" at 1800 Hz. This is followed by a series of five tones, at either 1400 or 1800 Hz, which specify the character. The final tone in the sequence is always a "stop tone" at 1400 Hz. The "stop tone" is a border that separates this character from the next. Each of the first six tones is 22 milliseconds in duration. The final "stop tone" is usually 33 milliseconds, but is permitted to be as long as 44 milliseconds. This means that the duration of each TTY character is at least 165 milliseconds, which works out to approximately six characters per second. (The description of this as a "45.45 Baud" protocol is based on the number of 22-millisecond tones that can be transmitted in one second, not the number of characters.)

From a usability perspective, one of the benefits to using a half-duplex, carrier-free protocol for TTYs is that it is possible to intermix voice and TTY transmissions on the same call. This is important because some people who use TTYs are individuals with speech loss who nevertheless are able to hear; these individuals often prefer to transmit with their TTYs and then hear the response, a process commonly referred to as Hearing Carry Over or HCO. Individuals with hearing loss, but who are nevertheless able to speak clearly, often prefer to receive with their TTYs and then speak in response; this is commonly referred to as Voice Carry Over or VCO.

From a usability perspective, this protocol also has several disadvantages, including: (1) TTY users must take turns typing to each other, and are unable to interrupt each other. (2) HCO and VCO users need a TTY device or specialized telephone in order to communicate. (3) People who receive a TTY message in their voicemail mailbox (which may include mailbox owners who have no communication disabilities, and therefore no easy access to a TTY device), need a TTY device or specialized software to read the message. (4) The absence of handshake tones means that there is no automatic mechanism by which to detect that a person is a TTY user until that person starts typing. (5) The protocol itself, although very robust when used in conjunction with traditional circuit-switched analog or digital telephony systems, tends to be unreliable when used in telephony systems that employ packet switching (e.g., Voice over Internet Protocol networks) or voice-optimized audio compression techniques (e.g., the GSM encoding used in many wireless systems).

The 45.45 Baud FSK protocol has been used in United States TTYs since 1963, and is based largely on the protocol that was used in military teletypewriters during the Second World War. Quite obviously, modern techniques would permit the development of new protocols that retain the advantages of the current protocol, while eliminating the disadvantages. Although many new protocols with excellent capabilities have been proposed, an important barrier stands in the way of their general acceptance: by some estimates, as many as 4,000,000 TTYs that use the 45.45 Baud protocol have been manufactured and distributed since 1963. This constitutes an enormous embedded base that cannot be upgraded or replaced economically. For this reason, it is desirable to solve the usability problems in a manner that does not require the 45.45 Baud protocol, and millions of current-generation TTY devices, to be abandoned.

Among the above-listed problems associated with the 45.45 Baud protocol, the issue that has been addressed explicitly in recent prior art concerns the inability of packet switched networks or voice-optimized compression codecs to support reliable TTY communication. Attention has been paid to these problems largely because, in the United States, Section 508 of the Workforce Investment Act of 1998, as well as Sections 251(a)(2) and 255 of the Telecommunication Act of 1996, require telephony systems to be TTY compatible.

With regard specifically to an issue addressed by this submission, FIGS. 1 and 2 illustrate the problems of performing HCO operations with a standard, 45.45 Baud, TTY such as TTY 102. To transmit or receive TTY information to other party 109, user 108 has to place the handset 107 into TTY 102 as illustrated in FIG. 1. FIG. 3 illustrates a pictorial view of a telephone and TTY such as shown in FIG. 1 having telephone 301 and TTY 302. If user 108 wants to use HCO operations, user 108 has to transmit TTY information as illustrated in FIG. 1, but hears by first removing handset 107 from the acoustic coupler of TTY 102 as illustrated in FIG. 2 and then hearing. To once again transmit TTY information, user 108 has to place handset 107 back into the acoustic coupler of TTY 102 before transmits TTY information to other party 109. This type of HCO operation is awkward at best. (U.S. Pat. No. 6,668,042, which is assigned to the assignee of the present submission, describes a telephone handset design that makes HCO operation a bit less cumbersome; however, even with this handset, a separate TTY device is still required in order to perform HCO operations.)

Another problem in the prior art is that the advent of the utilization of a display of a telecommunication terminal to receive instant messages (IM) and short message signaling (SMS) messaging presents a significant challenge for individuals with impaired vision. The IM messaging capability would be performed by the telecommunication system to which the telecommunication terminal is interconnected. The telecommunication system registers the presence of the user of the telecommunication terminal to presence or IM servers when the user is active on the telecommunication terminal. This allows another person an opportunity to send an IM message to the user that will be displayed on the display of the telecommunication terminal by streaming the text of the IM message across the display. The telecommunication terminal may be either a wired or wireless terminal. Within the prior art, the only solution to this problem is to add auxiliary and expensive equipment to perform the text to speech conversion.

Clearly, within the prior art, solutions for both sets of problems rely on enhancements to the endpoint configurations, typically consisting of physical devices that ordinarily would not be present on the desktop of a non-disabled user. This is important because, under Section 255 of the Telecommunications Act of 1996, the Federal Communications Commission is obligated to consider the cost of the incremental action before it can require an accessibility accommodation to be implemented. As a result, a solution that relies on additional hardware, beyond equipment that might ordinarily be available to the typical user, is unlikely to be required by the FCC and is therefore unlikely to be provided to the people who need it.

SUMMARY OF THE INVENTION

An apparatus and method convert streaming text to a display of a telecommunication terminal to audio by detecting the streaming text being transmitted to the digital display and performing the conversion.

Another embodiment converts text in one language directed to a display of a telecommunication terminal to text of another language and displays the resulting text on the display of the telecommunication terminal.

BRIEF DESCRIPTION OF THE DRAWING

FIGS. 8 and 9 illustrate, in flowchart form, an embodiment of operations performed for implementing the invention;

DETAILED DESCRIPTION

In one embodiment, the TTY or IM text that is being presented to a user of a telecommunication terminal is streamed to the display of the telecommunication terminal. In this embodiment, a monitor computer accesses the switching system sending the streaming text to the telecommunication terminal and obtains a connection on the switching system so that duplicate text information is streamed to the monitor computer. The monitor computer then converts the streaming text to audio and, in one embodiment, uses the internal audio output transducer of the monitor computer to reproduce this audio information to the user. In another embodiment, the monitor computer establishes a socket on the telecommunication terminal and utilizes the audio output transducer of the telecommunication terminal to reproduce the audio information by transferring the encoded audio information to the telecommunication terminal for reproduction. The monitor computer may be a personal computer, a personal digital assistant, or any other device well known to those skilled in the art for establishing IP type connections.

In a second embodiment, the telecommunication terminal in response to the need to convert streaming text information accesses a text to audio conversion routine from a server or other such device. The telecommunication terminal then establishes another socket on the switching system so that the streaming text information is also directed to the audio conversion routine which converts it to audio information. The audio conversion routine utilizes the audio output transducer of the telecommunication terminal to present this audio information to the user.

In another embodiment, a computer connects into a switching system as an IP endpoint such as an IP telephone subsequently the IP telephone connects to the computer. The computer first receives all control, text and audio information from the switching system and then communicates this information to the IP telephone. The computer translates the text information from one language to another language before communicating the text information to the IP telephone.

Figure 1:
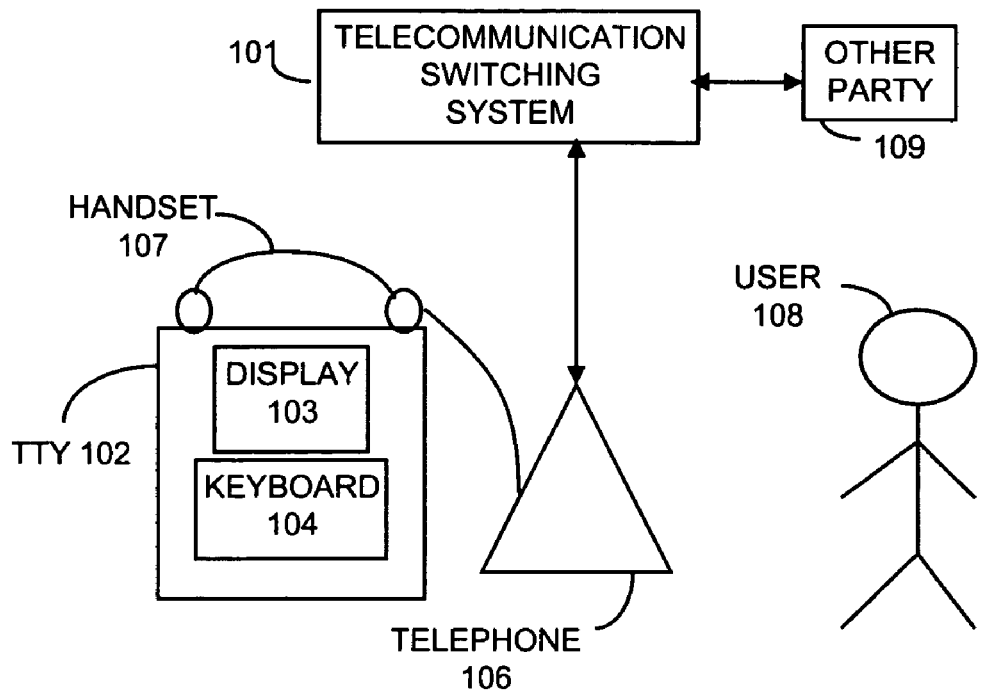
FIGS. 1 and 2 illustrate a prior art arrangement for performing HCO operations.
Figure 2:
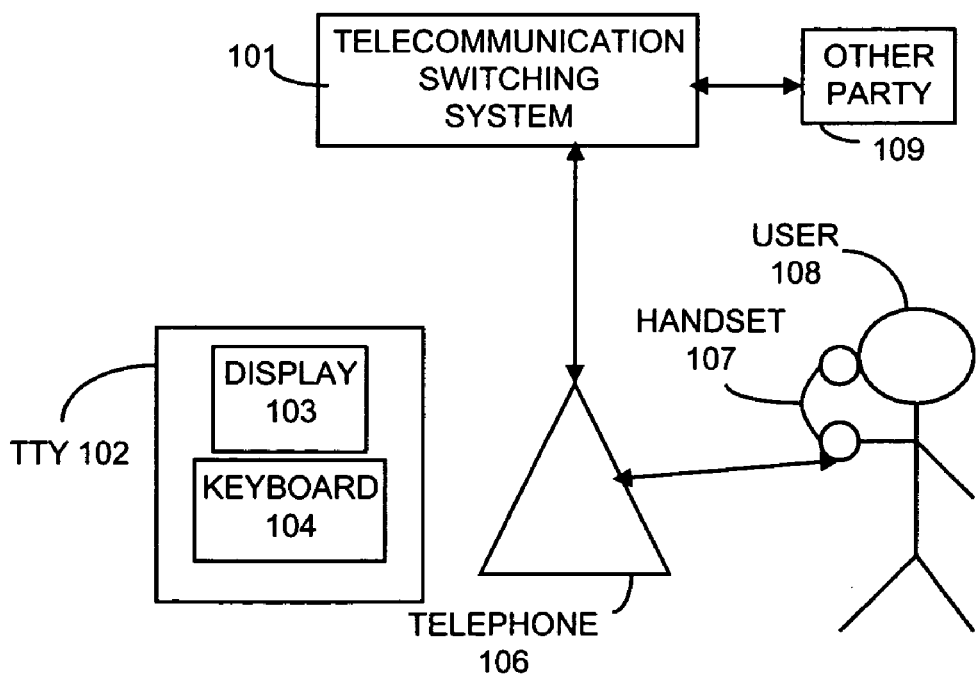
Figure 3:
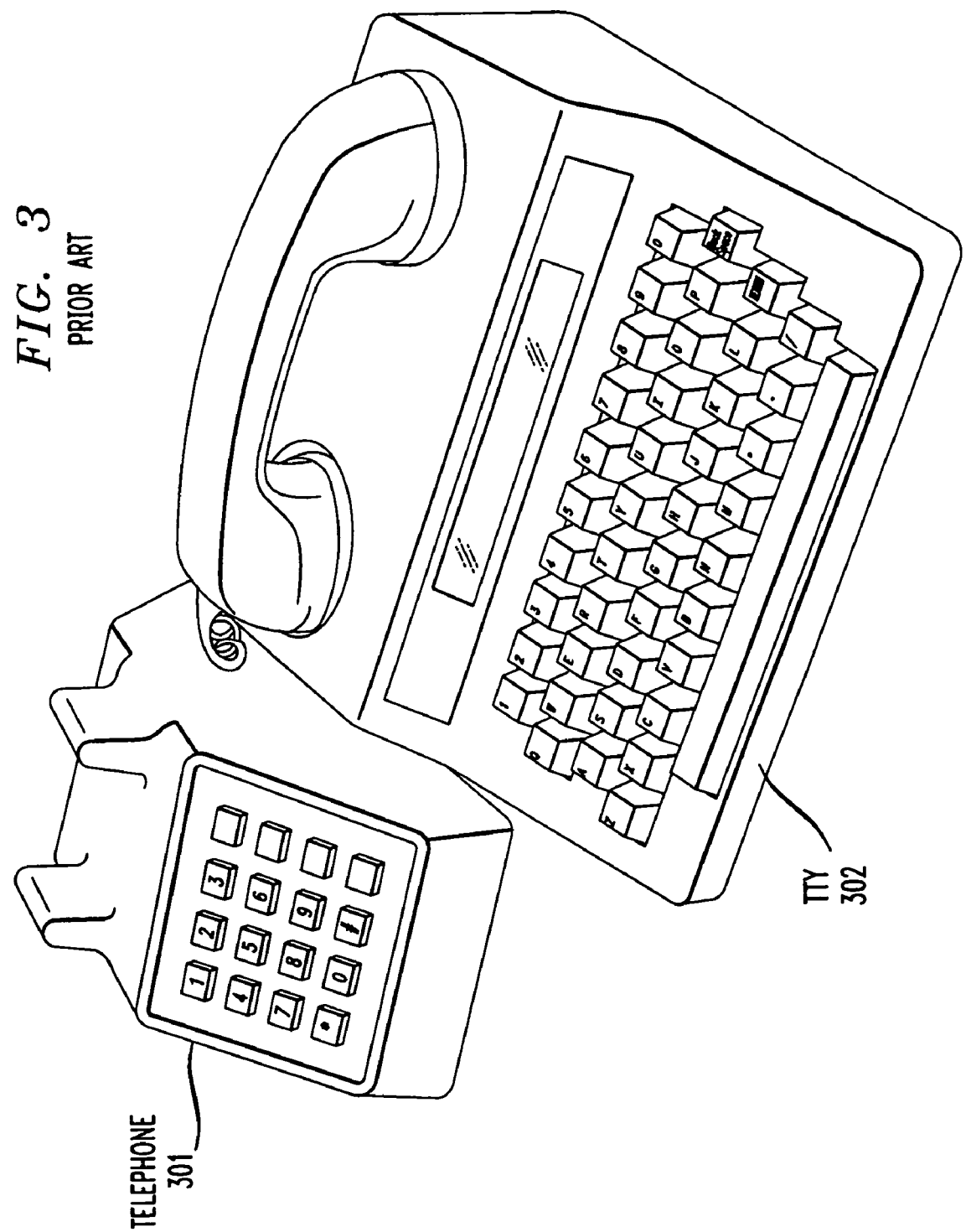
FIG. 3 pictorial view of the telephone and TTY terminal of FIG. 1.
Figure 4A:
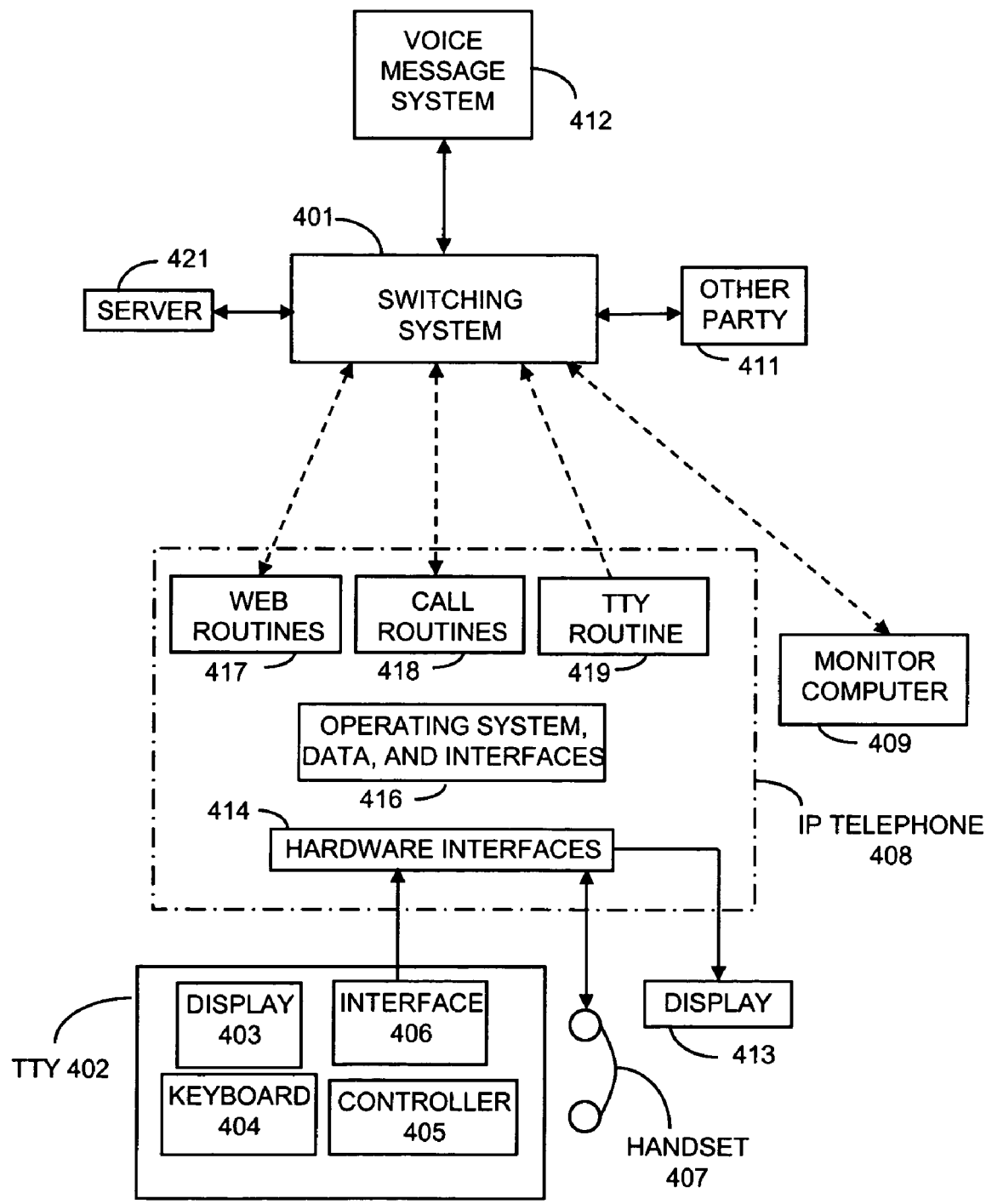
FIGS. 4A and 4B illustrate, in block diagram form, embodiments of systems for implementing the invention.

FIG. 4A illustrates, in block diagram form, an embodiment for implementing the HCO operations. In operation the TTY information may be received from a TTY-enabled voice messaging system 412 or other party 411. The text information may be streamed to IP telephone 408 utilizing the IP text protocol T.140 or any other protocol well known to those skilled in the art. The user transmits information to, for example, the other party 411 utilizing TTY 402 and receives information from other party 411 after it has been converted from TTY to audio information by monitor computer 409 via the audio output transducer of monitor computer 409 or IP telephone 408. As discussed in U.S. patent application Ser. No. 10/671,925, IP telephone 408 establishes a unilateral path for transmitting information from TTY 402 to switching system 401 and a unilateral path from switching system 401 for receiving streaming text information that is to be displayed on display 413. TTY routine 419 controls the transfer of information from TTY 402 to switching system 401. Switching system 401 then properly directs the information to voice messaging system 412 or other party 411. Hardware interfaces 414 provide the hardware interfaces for TTY 402, handset 407, and display 413. Block 416 provides the operating system, data storage, and the software interface routines. Call routines 418 control the overall call control and underlying control for telecommunication telephone calls. Web routines 417 supplies the operations that are required by monitor computer 409 to perform its operations as have been previously described in the incorporated U.S. patent applications.

Monitor computer 409 utilizing the telephone number and password for IP telephone 408 interrogates web routines 417 to obtain the IP address of IP telephone 408. It is also known, based on the disclosure of the incorporated U.S. patent applications, that the IP address could also be obtained from server 421. When monitor computer 409 detects the need to convert streaming text information to audio, monitor computer 409 accesses switching system 401 utilizing the IP address of IP telephone 408 and establishes a socket on switching system 401. Via this socket, the streaming text that is sent to IP telephone 408 for display on display 413 is also sent to monitor computer 409. Monitor computer 409 is responsive to this text stream to convert it to audio information. Monitor computer 409 may present this information to the user via an output audio transducer of monitor computer 409. In another embodiment, monitor computer 409 accesses switching system 401 and establishes an IP socket on IP telephone 408. Utilizing a web routine which had been downloaded for receiving audio information, monitor computer 409 transmits the encoded audio information to the audio routine in web routines 417 of IP telephone 408. The audio routine then utilizes handset 407 to play the audio information to the user. One skilled in the art would readily realize that IP telephone 408 could also have a speaker phone that could be utilized to present the information to the user.

Figure 4B:
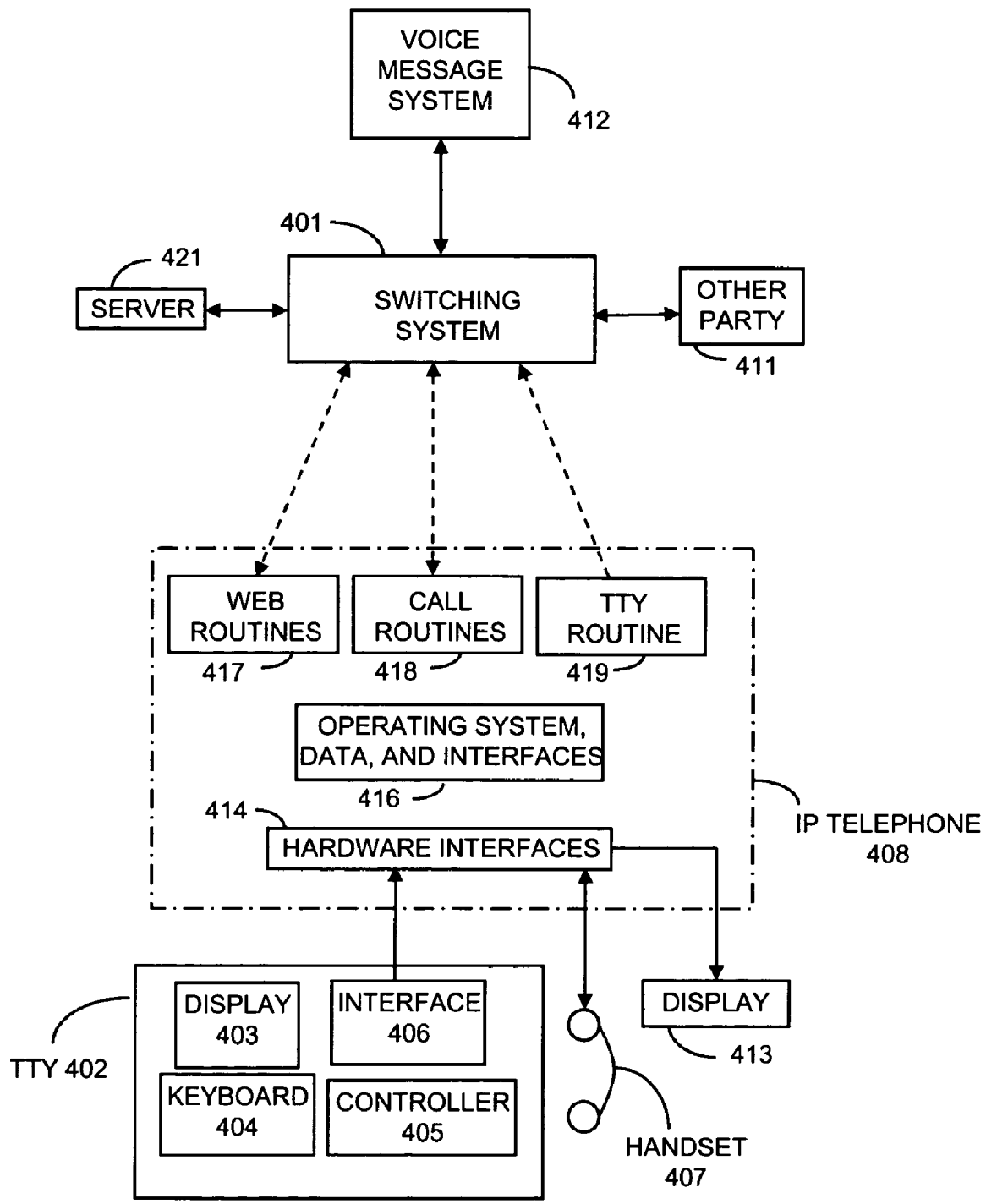

FIG. 4B illustrates, in block diagram form, another embodiment for allowing an individual to perform HCO operations utilizing TTY 402 and handset 407 where the text being streamed to display 413 is converted into audio information. In this embodiment, additional routines in web routines 417 access server 421 to obtain the programs necessary to perform the text to audio conversion and also the routine necessary to access switching system 401 to establish a socket. Via this socket, the streaming text information is transmitted to IP telephone 408 for display on display 413 is obtained by this routine and is then transferred to the routine for performing the text to audio conversion in WEB routines 417. The information is then presented to the user on handset 407. Further details on this operation are given with respect to the flowcharts illustrated in FIGS. 8 and 9.

Figure 5:
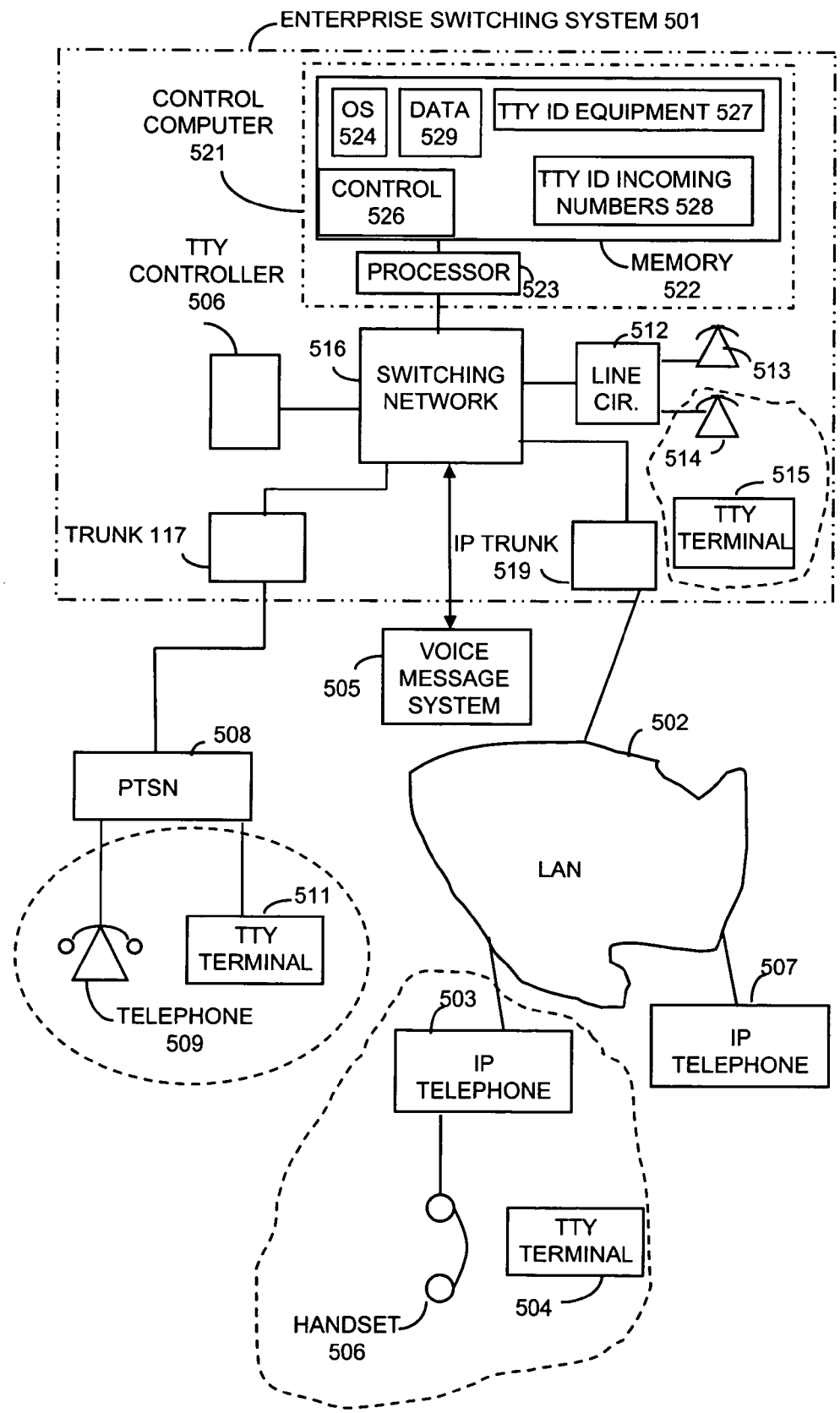
FIG. 5 illustrates, in block diagram form, an embodiment of a system for implementing the invention.

FIG. 5 illustrates an embodiment of a system for implementing the invention. Enterprise switching system 501 is providing service for directly connected telephones 513–114 via line circuit 512 and switching network 516. Telephones 513–514 are digital telephone using either an ISDN telephone or proprietary protocol digital telephones. Digital telephones have alphanumeric displays that are controlled by control computer 521 via a signaling/control channel. Digital telephone 514 supports TTY terminal 515. Further, enterprise switching system 501 is providing call operations for IP telephone 503 and IP telephone 507 via LAN 502, IP trunk 519, and switching network 516. One skilled in the art would readily realize that there would be more wired telephones and IP telephones in a system such as illustrated in FIG. 5. IP telephone 503 is illustrated as being able to communicate with a user via handset 506 and TTY terminal 504. IP telephone 503 also provides visual and other audio alerting means. A WAN or other digital networks well known to those skilled in the art may be used in place of LAN 502. Control computer 521 controls Enterprise switching system 501. The operations of processor 523 and memory 522 will be detailed later. TTY controller 506 illustrates an embodiment of a controller for implementing the invention.

Enterprise switching system 501 is interconnected to public telephone switching network 508 via trunk 517. For illustration purposes, public telephone switching network 508 is illustrated as being connected to only telephone 509 and TTY terminal 511. However, one skilled in the art would readily realize that there would be a multitude of telephone equipment connected to public telephone switching network 508.

Figure 6:
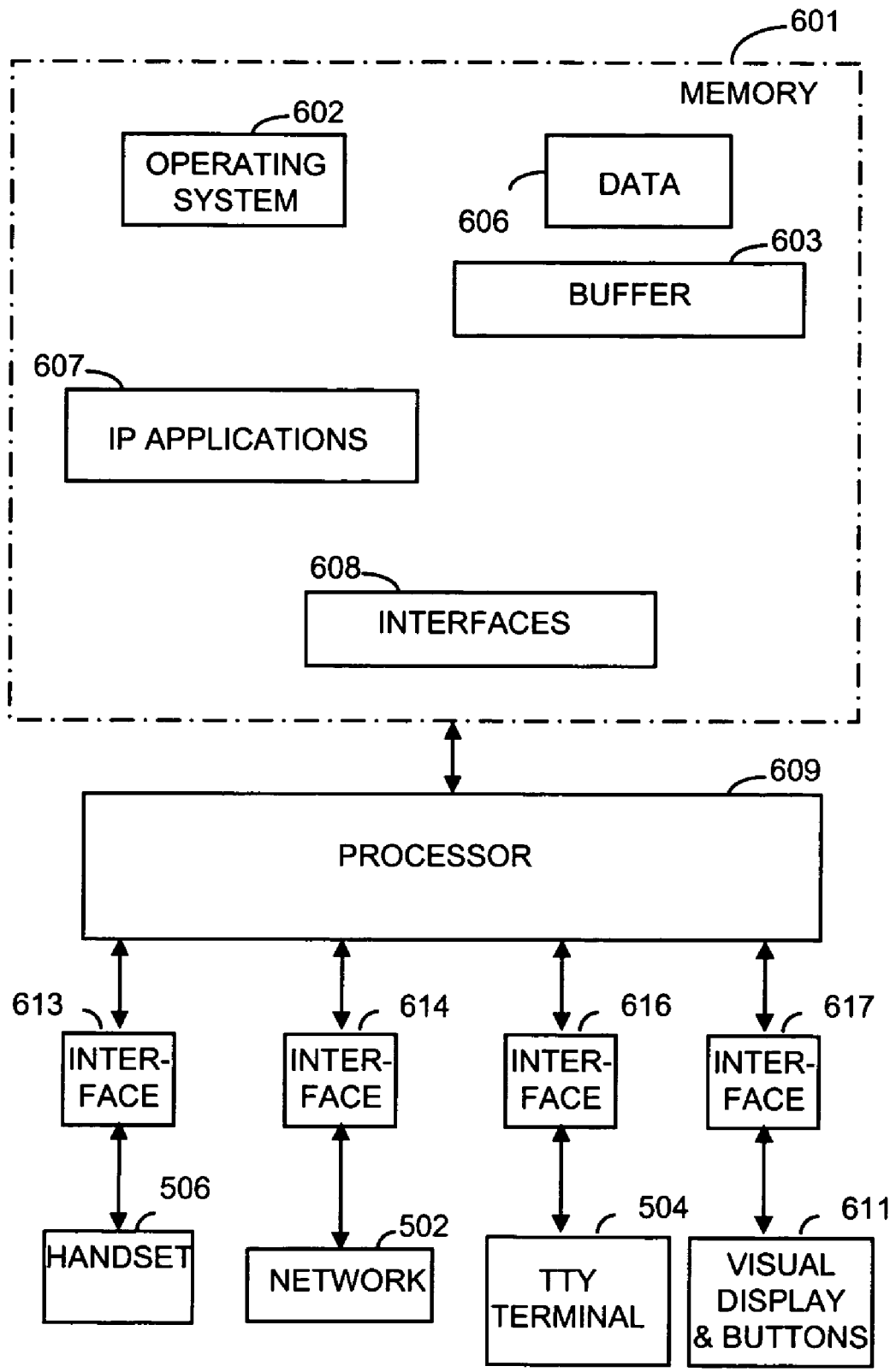
FIG. 6 illustrates, in block diagram form, an embodiment of an IP telephone.

FIG. 6 illustrates, in block diagram form, an embodiment of an IP telephone such as IP telephone 503. Processor 609 controls the operations of the IP telephone by executing applications stored in memory 601 utilizing data also stored there. Processor 609 communicates information with handset 506 via interface 613 and communicates with LAN 502 via interface 614. Communication with a TTY terminal is via interface 616. The IP telephone also has a visual display, buttons, and alerting means to provide signaling to and from the user. These visual displays, buttons, etc. are illustrated as block 611. Processor 609 communicates with block 611 via interface 617.

To perform the operations of an IP telephone, processor 609 executes IP applications 607 stored in memory 601. The overall control of the IP telephone is provided by execution of operating system 602 by processor 609. Processor 609 utilizes data 606 for the storage of various types of parameters and information. Buffer 603 is used to provide storage for audio or TTY information. To communicate with interfaces 613–617, processor 609 executes interfaces application 608.

Figure 7:
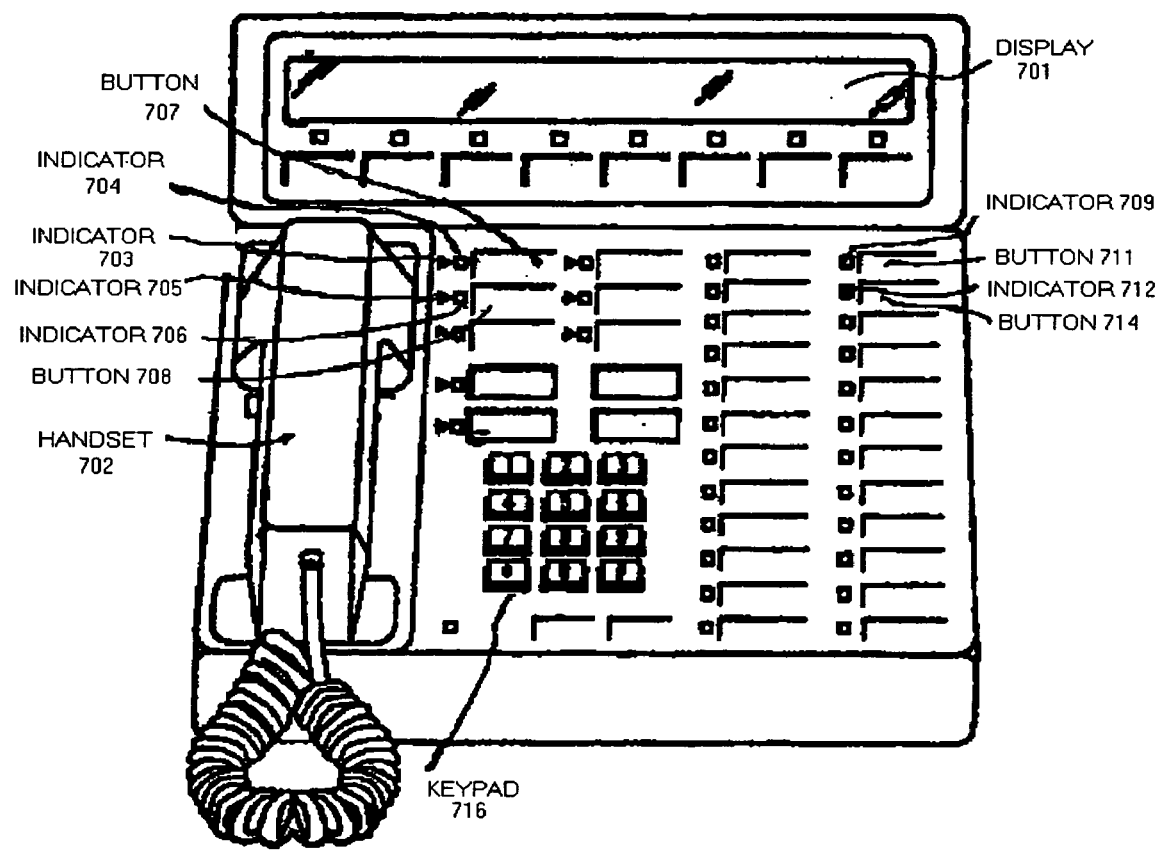
FIG. 7 illustrates, in pictorial form, an embodiment of a digital telephone.

FIG. 7 illustrates an embodiment of a telephone set such as IP telephone 503 or digital telephone 514. With respect to an IP telephone as illustrated in FIG. 6, visual display and buttons block 611 would include display 701, keypad 716, indicators such as indicators 704–706, 709, and 712, buttons such as 706–708, 711, and 714. The other buttons and indicators illustrated in FIG. 7 will also comprise block 611 of FIG. 6. Handset 702 also would be comparable to handset 506.

Figure 8:
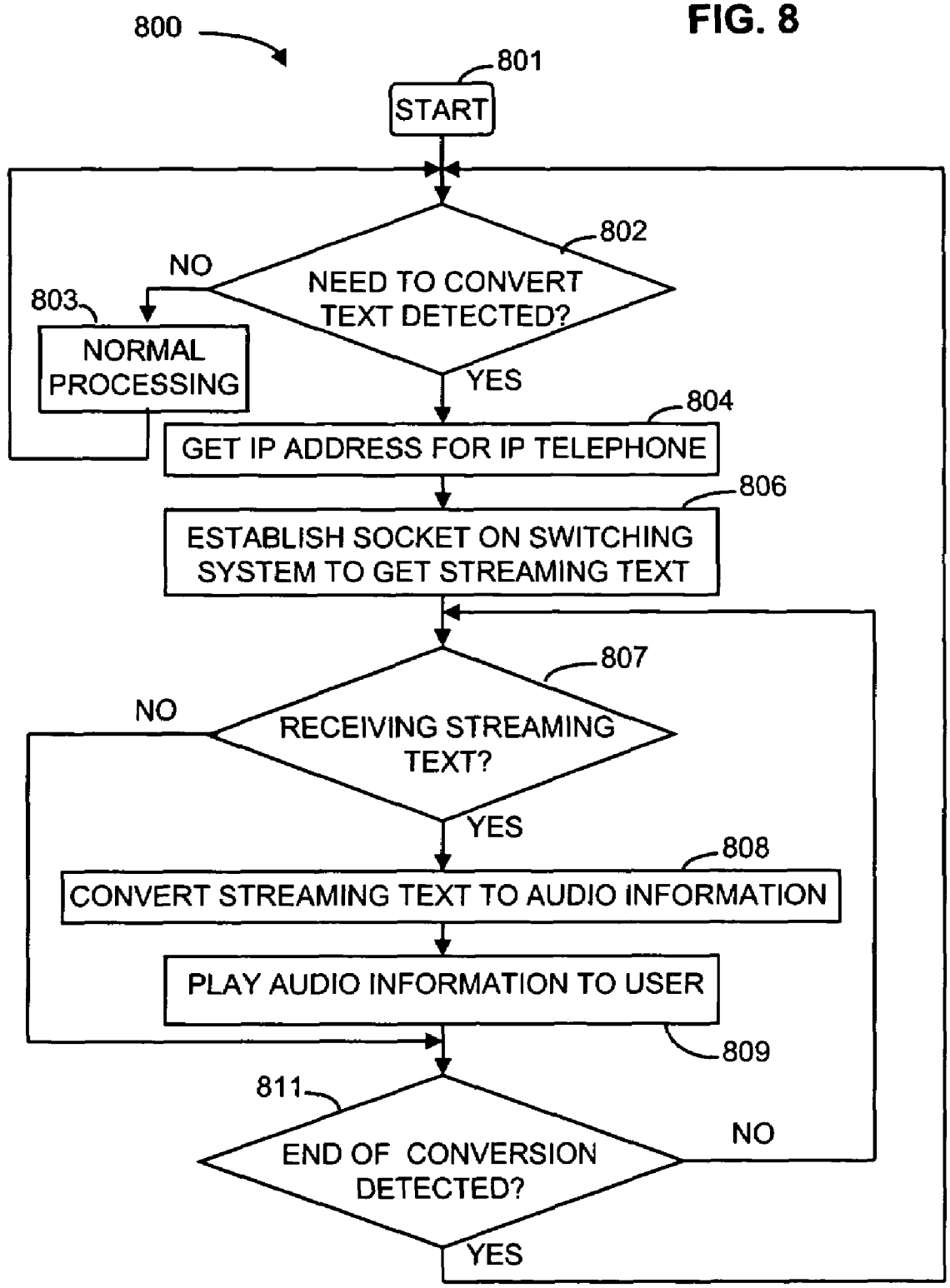
Figure 10A:
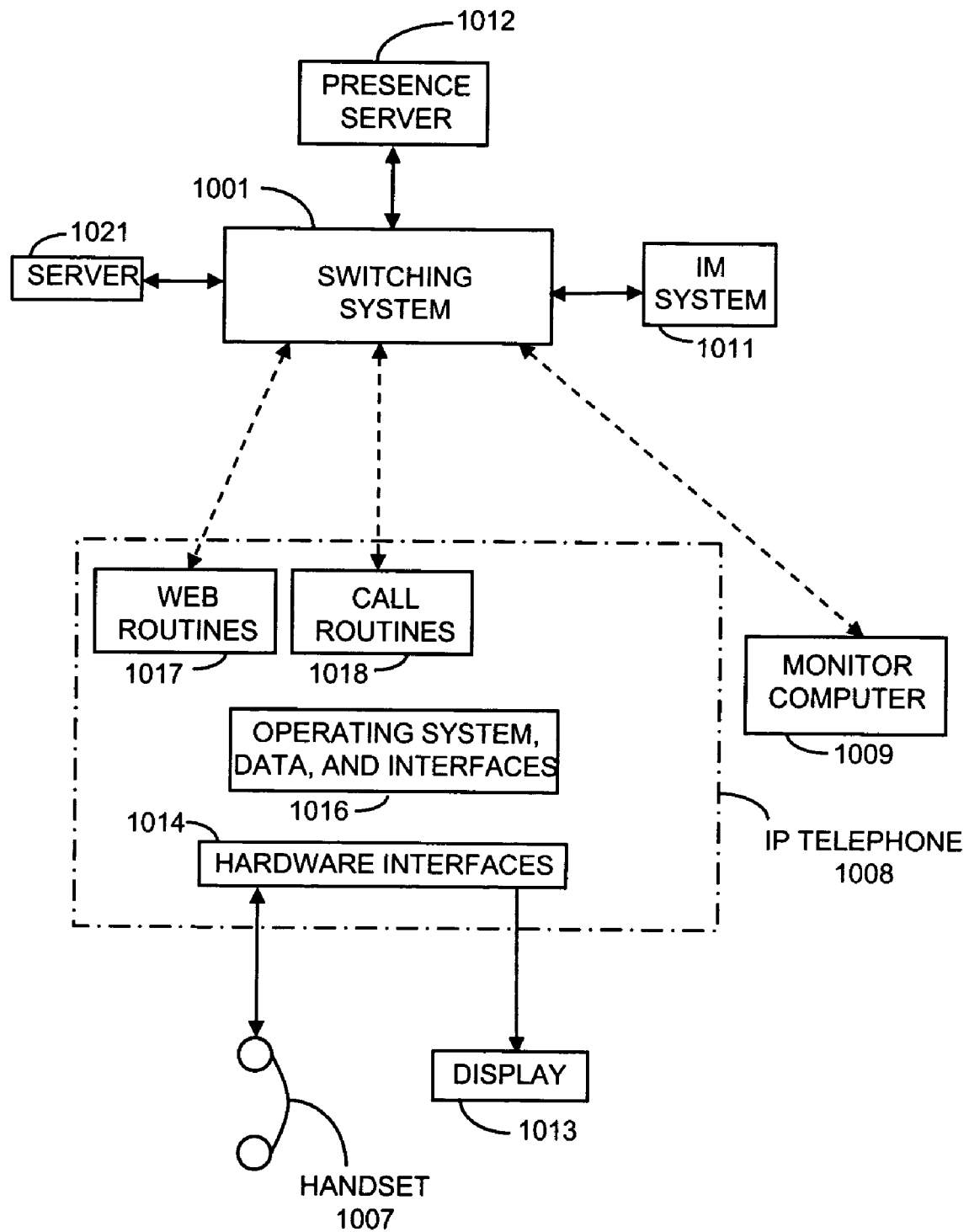
FIGS. 10A and 10B illustrate, in block diagram form, embodiments of systems for implementing the invention.

FIG. 8 illustrates embodiment 800 that illustrates in flowchart form the operations performed by monitor computer 409 of FIG. 4A or monitor computer 1009 of FIG. 10A. After being started in block 801, decision block 802 determines if it has been detected that there is a need to start to convert streaming text. This detection can be indicated to the monitor computer by the user via a keyboard attached to the monitor computer. If the answer in decision block 802 is no, block 803 performs normal processing before returning control back to decision block 802. If the decision in decision block 802 is yes, block 804 accesses the IP address for the IP telephone either from the IP telephone itself or from another source as set forth in the incorporated U.S. patent applications. Then, block 806 establishes a socket on the switching system to receive the streaming text information that is being directed to the display of the IP telephone.

Decision block 807 determines if text is being received from the switching system. If the answer is no, control is transferred to decision block 811. If the answer in decision block 807 is yes, block 808 converts the streaming text to audio information, and block 809 plays this audio information to the user. In another embodiment, block 808 converts the text from one language to audio information of another language. As is described in the incorporated patent applications, the audio information can be played to the user using an audio transducer within the monitor computer or by using an audio transducer of the IP telephone. After execution of block 809, decision block 811 determines if the end of a conversion process has been detected. This detection may be done by the user signaling the monitor computer or may be accomplished by determining that streaming text is no longer being received from the switching system.

FIG. 9 illustrates embodiment 900 that illustrates in flowchart form the operations performed by monitor computer 409 of FIG. 4A or monitor computer 1009 of FIG. 10A. After being started in block 901, decision block 902 determines if it has been detected that there is a need to start to convert streaming text. This detection can be indicated to the monitor computer by the user via a keyboard attached to the monitor computer. If the answer in decision block 902 is no, block 903 performs normal processing before returning control back to decision block 902. If the decision in decision block 902 is yes, block 906 establishes a socket on the switching system to receive the streaming text information that is being directed to the display of the IP telephone.

Decision block 907 determines if text is being received from the switching system. If the answer is no, control is transferred to decision block 911. If the answer in decision block 907 is yes, block 908 converts the streaming text to audio information, and block 909 plays this audio information to the user. In another embodiment, block 908 converts the text from one language to audio information of another language. As is described in the incorporated patent applications, the audio information can be played to the user using an audio transducer within the monitor computer or by using an audio transducer of the IP telephone. After execution of block 909, decision block 911 determines if the end of a conversion process has been detected. This detection may be done by the user signaling the monitor computer or may be accomplished by determining that streaming text is no longer being received from the switching system.

Figure 10B:
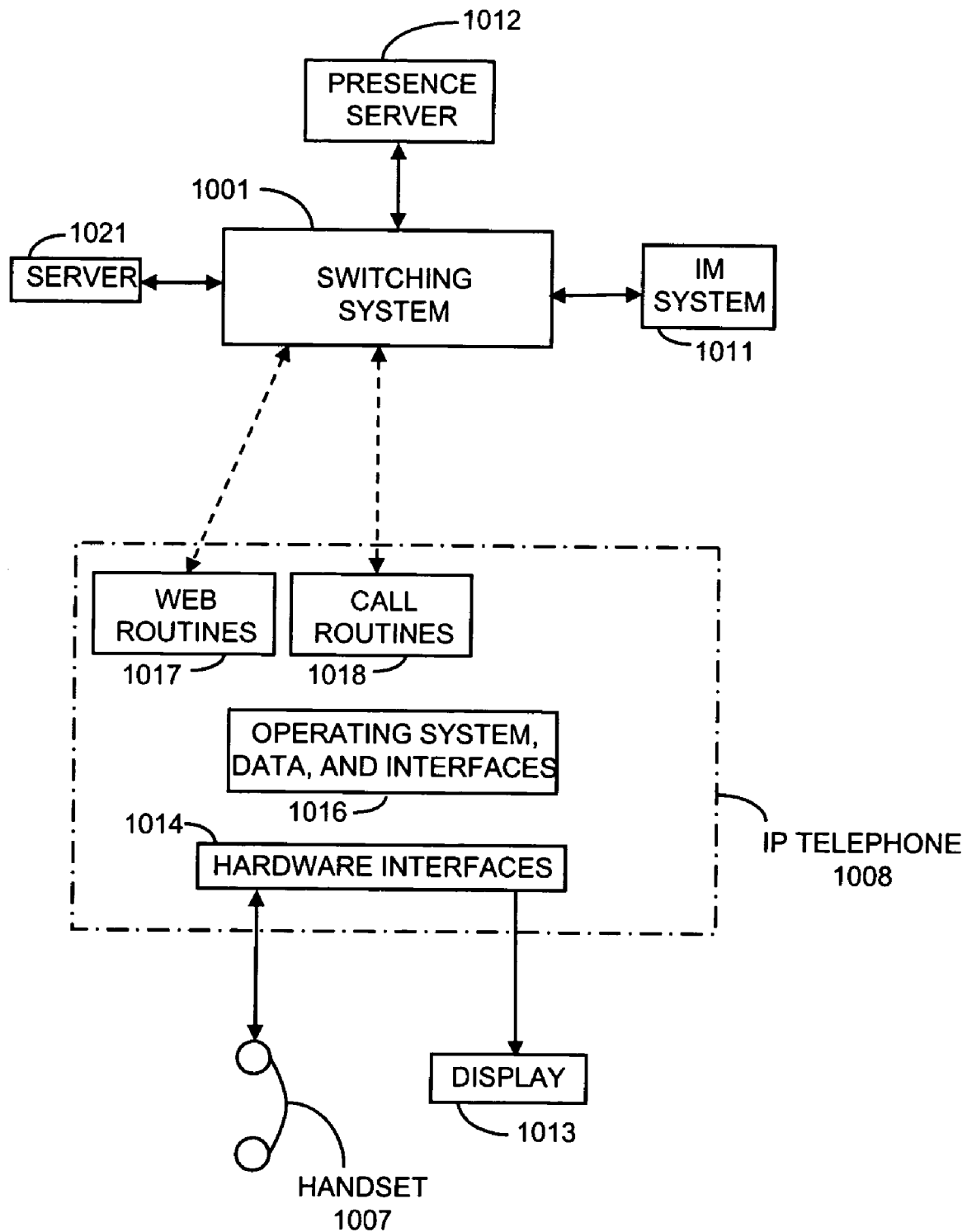

FIGS. 10A and 10B illustrate a similar streaming text type conversion as those described in FIGS. 4A and 4B with the exception being that information is being streamed from IM system 1011. The text information may be streamed to IP telephone 1008 utilizing the IP text protocol T.140 or any other protocol well known to those skilled in the art. The user may transmit information to IM system 1011 utilizing the customary means and receives information from other party 1011 after it has been converted from IM to audio information by monitor computer 1009 via the audio output transducer of monitor computer 1009 or IP telephone 1008. As discussed in U.S. patent application Ser. No. 10/671,925, IP telephone 1008 establishes a unilateral path from switching system 1001 for receiving streaming text information that is to be displayed on display 1013. IM routine 1019 controls the transfer of IM information to switching system 1001. Switching system 1001 then properly directs the information from IM system 1011. Hardware interfaces 1014 provide the hardware interfaces for handset 1007 and display 1013. Block 1016 provides the operating system, data storage, and the software interface routines. Call routines 1018 control the overall call control and underlying control for telecommunication telephone calls. Web routines 1017 supplies the operations that are required by monitor computer 1009 to perform its operations as have been previously described in the incorporated U.S. patent applications. Switching system 1012 may register the presence of a user on presence server 1012.

Monitor computer 1009 utilizing the telephone number and password for IP telephone 1008 interrogates web routines 1017 to obtain the IP address of IP telephone 1008. It is also known, based on the disclosure of the incorporated U.S. patent applications, that the IP address could also be obtained from server 1021. When monitor computer 1009 detects the need to convert streaming text information to audio, monitor computer 1009 accesses switching system 1001 utilizing the IP address of IP telephone 1008 and establishes a socket on switching system 1001. Via this socket, the streaming text that is sent to IP telephone 1008 for display on display 1013 is also sent to monitor computer 1009. Monitor computer 1009 is responsive to this text stream to convert it to audio information. Monitor computer 1009 may present this information to the user via an output audio transducer of monitor computer 1009. In another embodiment, monitor computer 1009 accesses switching system 1001 and establishes an IP socket on IP telephone 1008. Utilizing a web routine which had been downloaded for receiving audio information, monitor computer 1009 transmits the encoded audio information to the audio routine in web routines 1017 of IP telephone 1008. The audio routine then utilizes handset 1007 to play the audio information to the user. One skilled in the art would readily realize that IP telephone 1008 could also have a speaker phone that could be utilized to present the information to the user.

FIG. 10B illustrates, in block diagram form, another embodiment where the IM text being streamed to display 1013 is converted into audio information. In this embodiment, additional routines in web routines 1017 access server 1021 to obtain the programs necessary to perform the text to audio conversion and also the routine necessary to access switching system 1001 to establish a socket. Via this socket, the streaming text information is transmitted to IP telephone 1008 for display on display 1013 is obtained by this routine and is then transferred to the routine for performing the text to audio conversion in WEB routines 1017. The information is then presented to the user on handset 1007. Further details on this operation are given with respect to the flowcharts illustrated in FIGS. 8 and 9.

Figure 11:
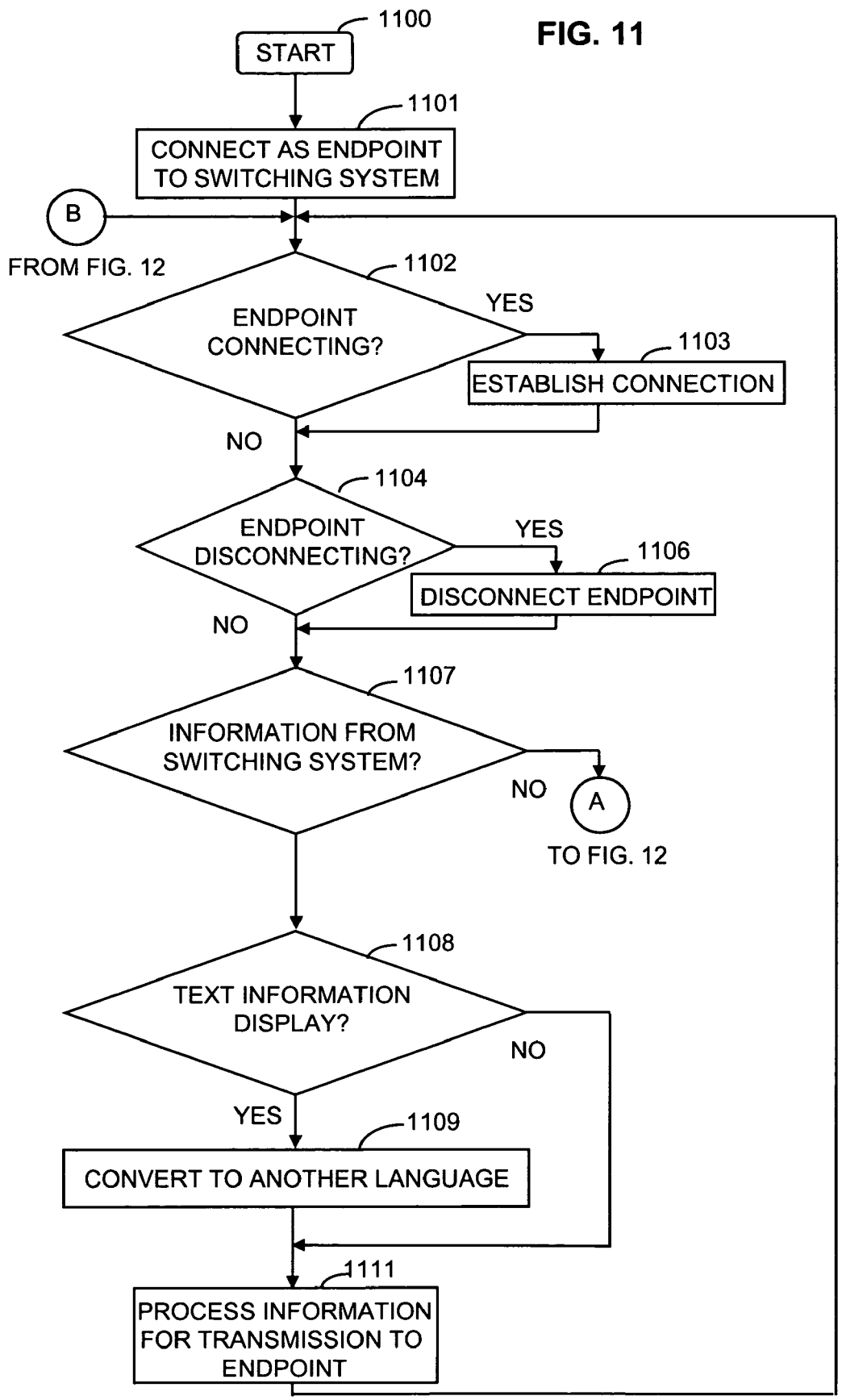
FIGS. 11 and 12 illustrate, in flowchart form, an embodiment of operations for implementing the invention.
Figure 12:
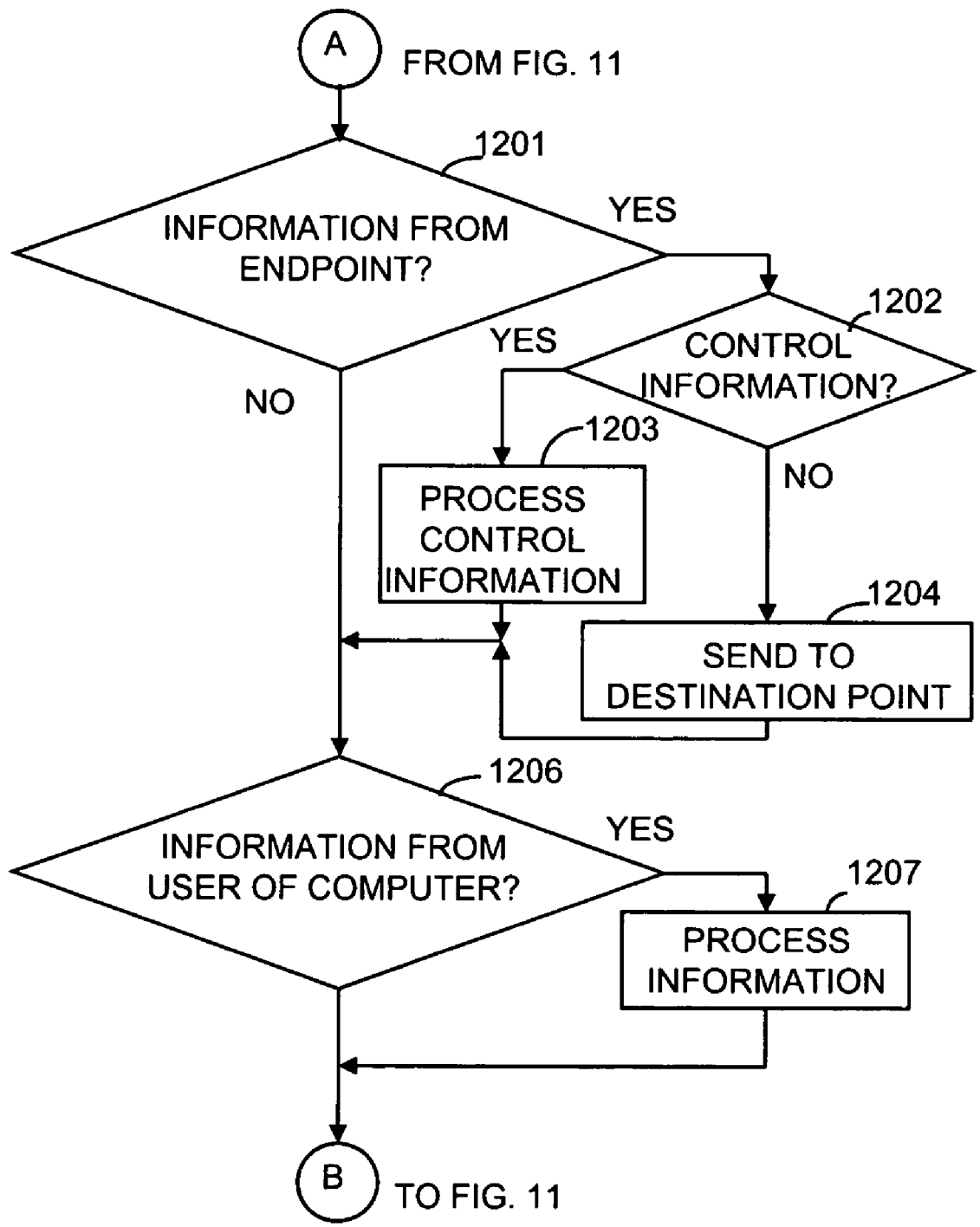

FIGS. 11 and 12 illustrate, in flowchart form, an embodiment of operations for allowing a computer such as computers 409 or 1009 to translate text from one language to another language for display on an IP telephone such as IP telephone 408 or 1008, respectively. One computer can perform this translation operation for a number of IP telephones. The computer connects into a switching system as an IP endpoint such as an IP telephone subsequently the IP telephone connects to the computer. The computer first receives all control, text and audio information from the switching system and then, communicates this information to the IP telephone. These operations are described in greater detailed in incorporated U.S. patent application Ser. No. 10/371,639. The computer translates the text information from one language to another language before communicating the text information to the IP telephone. The text information may be streaming information such as TTY, IM or SMS messages or call status information.

Once started in block 1100, block 1101 connects as an endpoint to a switching system such switching system 401 or 1001. Decision block 1102 determines if an IP endpoint such as a IP telephone is connecting to the computer. Note, although only one IP endpoint is described, the computer can support multiple IP endpoints. If the answer in decision block 1102 is yes, block 1103 establishes a connection with the IP endpoint before transferring control to decision block 1104. If the answer is no in decision block 1102, control is transferred to decision block 1104.

Decision block 1104 determines if the IP endpoint has disconnect. If the answer is yes, block 1106 processes the disconnect before transferring control to decision block 1107. If the answer is no in decision block 1104, control is transferred to decision block 1107.

Decision block 1107 determines if information is being received from the switching system. If the answer is yes, control is transferred to decision block 1108 which determines if the information is text information to be displayed on the IP endpoint such as on a visual display of an IP telephone or is audio information. If the information is text information, block 1109 converts the text to another language using well known techniques to those skilled in the art before transferring control to block 1111. Block 1111 processes the resulting information for transmission to the IP endpoint before transferring control to decision block 1102. If the answer is no in decision block 1108, control is transferred to block 1111.

Returning to decision block 1107, if the answer is no, control is transferred to decision block 1201 of FIG. 12. Decision block 1201 determines if information is being received from the IP endpoint. If the answer is yes in decision block 1201, control is transferred to decision block 1202 which determines if the information is control or audio information. If the answer is yes in decision block 1202 that the information is control information, control is transferred to block 1203 which process the information for transmission to the switching system before transferring control to decision block 1206. If the answer is no in decision block 1202, control is transferred to block 1204 which transmits the information to the destination point of the call before transferring control to decision block 1204.

Decision block 1206 determines if the user of the computer is inputting information affecting the operations of FIGS. 11 and 12 such as changing the language to which translation is being performed. If the answer is yes in decision block 1206, block 1207 processes the user input before transferring control to 1102 of FIG. 11. If the answer is no in decision block 1206, control is transferred to decision block 1102.

When the operations of devices are implemented in software, as is shown in FIGS. 8, 9, 11 and 12, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Devices 521 and 609 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where devices are implemented in hardware, the devices can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for transforming TTY information to audio information, comprising the steps of:
   detecting a need to convert TTY information being transmitted as text information to audio information for a telecommunication terminal;
   requesting by a computer a IP socket connection to another computer controlling a telecommunication switching system to which the telecommunication terminal is connected;
   connecting to the other computer via the IP socket by the computer;
   accessing the text information from the telecommunication switching system by the computer via the IP socket connection;
   converting the accessed text information to the audio information; and
   playing the converted audio information.

2. The method of claim 1 wherein the step of accessing comprises the step of reading the text information from the other computer by the computer via the IP socket.

3. The method of claim 1 wherein the step of converting comprises the step of translating to audio information of another language than a language of the received text information.

4. An apparatus for implementing the steps of claim 3.

5. The method of claim 1 wherein the step of playing comprises the step of producing the audio information on a transducer of the computer that is converting the text information to the audio information.

6. The method of claim 1 wherein the step of playing comprises the steps of transmitting the audio information to the telecommunication terminal by the computer that is converting the text information to the audio information; and
producing the audio information on a transducer of the telecommunication terminal.

7. An apparatus for implementing the steps of claim 1.

8. A method for transforming TTY information to audio information, comprising the steps of:
detecting by a telecommunication terminal a need to convert TTY information being transmitted as text information to audio information for the telecommunication terminal;
establishing a communication path with a telecommunication switching system controlling the telecommunication terminal by the telecommunication terminal;
directly accessing the text information from the telecommunication switching system by the telecommunication terminal via the communication path that is distinct from that used to transmit the text information to the telecommunication terminal;
converting by the telecommunication terminal the accessed text information to the audio information; and
playing the converted audio information.

9. The method of claim 8 wherein the step of establishing comprises the steps of requesting a IP socket connection to another computer controlling the telecommunication switching system to which the telecommunication terminal is connected; and
connecting to the other computer via the IP socket by the telecommunication terminal.

10. The method of claim 9 wherein the step of accessing comprises the step of reading the text information from the other computer by the telecommunication terminal via the IP socket.

11. The method of claim 8 wherein the step of playing comprises the step of producing the audio information on a transducer of the telecommunication terminal that is converting the text information to the audio information.

12. An apparatus for implementing the steps of claim 8.

13. A method for transforming text information of at least one of an IM or SMS message to audio information for a telecommunication terminal, comprising the steps of:
detecting a need to convert the text information of the at least one of the IM or SMS message being transmitted as text information to audio information;
requesting by a computer a IP socket connection to another computer controlling a telecommunication switching system to which the telecommunication terminal is connected;
connecting to the other computer via the IP socket by the computer;
accessing the text information from the telecommunication switching system by the computer via the IP socket connection;
converting the accessed text information to the audio information; and
playing the converted audio information.

14. The method of claim 13 wherein the step of accessing comprises the step of reading the text information from the other computer by the computer via the IP socket.

15. The method of claim 13 the step of converting comprises the step of translating to audio information in another language than a language of the received text information.

16. The method of claim 13 wherein the step of playing comprises the step of producing the audio information on a transducer of the computer that is converting the text information to the audio information.

17. The method of claim 13 wherein the step of playing comprises the steps of transmitting the audio information to the telecommunication terminal by the computer that is converting the text information to the audio Information; and
producing the audio information on a transducer of the telecommunication terminal.

18. An apparatus for implementing the steps of claim 13.

19. A method for transforming text information of at least one of an IM or SMS message to audio information for a telecommunication terminal, comprising the steps of:
detecting by the telecommunication terminal a need to convert the text information of the at least one of the IM or SMS message being transmitted as text information to audio information;
establishing a communication path with a telecommunication switching system controlling the telecommunication terminal by the telecommunication terminal; and
directly accessing the text information from the telecommunication switching system by the telecommunication terminal via the communication path that is distinct from that used to transmit the text information to the telecommunication terminal;
converting by the telecommunication terminal the accessed text information to the audio information; and
playing the converted audio information.

20. The method of claim 19 wherein the step of establishing comprises the steps of requesting a IP socket connection to another computer controlling a telecommunication switching system to which the telecommunication terminal is connected; and
connecting to the other computer via the IP socket by the telecommunication terminal.

21. The method of claim 20 wherein the step of accessing comprises the step of reading the text information from the other computer by the telecommunication terminal via the IP socket.

22. The method of claim 19 wherein the step of playing comprises the step of producing the audio information on a transducer of the telecommunication terminal that is converting the text information to the audio information.

23. An apparatus for implementing the steps of claim 19.

24. A method for providing telephony operations, comprising the steps of:
registering on a switching system by a computer as a telephony endpoint;
establishing a connection with the telephony endpoint by the computer in response to a request from the telephony endpoint received via the switching system;
receiving text information for the telephony endpoint from the switching system by the computer;
translating the received text information to another language by the computer in response to the received text information from the switching system; and
transmitting the translated text information to the telephony endpoint.

25. The method of claim 24 wherein the text information is at least one of call status information, TTY information, IM information, or SMS information.

26. The method of claim 25 further comprises the step of displaying translated text information on a visual display of the telephony endpoint.

27. An apparatus for implementing the steps of claim 24.

28. A processor-readable medium for transforming TTY information to audio information, comprising processor-executable instructions on a computer configured for:
- detecting a need to convert TTY information being transmitted as text information to audio information;
- requesting by the computer a IP socket connection to another computer controlling a telecommunication switching system to which the telecommunication terminal is connected;
- connecting to the other computer via the IP socket by the computer;
- accessing the text information from the telecommunication switching system by the computer via the IP socket connection;
- converting the accessed text information to the audio information; and
- playing the converted audio information.

29. The processor-readable medium of claim 28 wherein the processor-executable instructions of accessing comprises processor-executable instructions of reading the text information from the other computer by the computer via the IP socket.

30. The processor-readable medium of claim 28 wherein the processor-executable instructions of converting comprises the step of translating to audio information of another language than a language of the received text information.

31. The processor-readable medium of claim 28 wherein the processor-executable instructions of playing comprises processor-executable instructions of producing the audio information on a transducer of the computer that is converting the text information to the audio information.

32. The processor-readable medium of claim 28 wherein the processor-executable instructions of playing comprises processor-executable instructions of transmitting the audio information to the telecommunication terminal by the computer that is converting the text information to the audio information; and
- producing the audio information on a transducer of the telecommunication terminal.

33. A processor-readable medium for transforming TTY information to audio information, comprising processor-executable instructions on a telecommunication terminal configured for:
- detecting a need to convert TTY information being transmitted as text information to audio information;
- establishing a communication path with a telecommunication switching system controlling the telecommunication terminal by the telecommunication terminal;
- directly accessing the text information from the telecommunication switching system by the telecommunication terminal via the communication path that is distinct from that used to transmit the text information to the telecommunication terminal;
- converting the accessed text information to the audio information; and
- playing the converted audio information.

34. The processor-readable medium of claim 33 wherein the processor-executable instructions of establishing comprises processor-executable instructions of requesting a IP socket connection to another computer controlling a telecommunication switching system to which the telecommunication terminal is connected; and
- connecting to the other computer via the IP socket by the telecommunication terminal.

35. The processor-readable medium of claim 34 wherein the processor-executable instructions of accessing comprises processor-executable instructions of reading the text information from the other computer by the telecommunication terminal via the IP socket.

36. The processor-readable medium of claim 33 wherein the processor-executable instructions of playing comprises processor-executable instructions of producing the audio information on a transducer of the telecommunication terminal that is converting the text information to the audio information.

37. A processor-readable medium for transforming text information of at least one of an IM or SMS message to audio information, comprising processor-executable instructions on a computer configured for:
- detecting a need to convert the text information of the at least one of the IM or SMS message being transmitted as text information to audio information;
- requesting by the computer a IP socket connection to another computer controlling a telecommunication switching system to which the telecommunication terminal is connected;
- connecting to the other computer via the IP socket by the computer;
- accessing the text information from the telecommunication switching system by the computer via the IP socket connection;
- converting the accessed text information to the audio information; and
- playing the converted audio information.

38. The processor-readable medium of claim 37 wherein the processor-executable instructions of accessing comprises processor-executable instructions of reading the text information from the other computer by the computer via the IP socket.

39. The processor-readable medium of claim 37 wherein the processor-executable instructions of converting comprises processor-executable instructions of translating to audio information in another language than a language of the received text information.

40. The processor-readable medium of claim 37 wherein the processor-executable instructions of playing comprises processor-executable instructions of producing the audio information on the transducer of a computer that is converting the text information to the audio information.

41. The processor-readable medium of claim 37 wherein the processor-executable instructions of playing comprises processor-executable instructions of transmitting the audio information to the telecommunication terminal by the computer that is converting the text information to the audio information; and
- producing the audio information on a transducer of the telecommunication terminal.

42. A processor-readable medium for transforming text information of at least one of an IM or SMS message to audio information, comprising processor-executable instructions on a telecommunication terminal configured for:
- detecting a need to convert at least one of an IM or SMS message being transmitted as text information to audio information;
- establishing a communication path with a telecommunication switching system controlling the telecommunication terminal by the telecommunication terminal; and directly accessing the text information from the telecommunication switching system by the telecommunication terminal via the communication path that is distinct from that used to transmit the text information to the telecommunication terminal, establishing a communication path with a telecommunication switching system controlling the telecommunication terminal by the telecommunication terminal;

converting the accessed text information to the audio information; and playing the converted audio information.

43. The processor-readable medium of claim 42 wherein the processor-executable instructions of establishing comprises processor-executable instructions of requesting a IP socket connection to another computer controlling a telecommunication switching system to which the telecommunication terminal is connected; and connecting to the other computer via the IP socket by the telecommunication terminal.

44. The processor-readable medium of claim 43 wherein the processor-executable instructions of accessing comprises processor-executable instructions of reading the text information from the other computer by the telecommunication terminal via the IP socket.

45. The processor-readable medium of claim 42 wherein the processor-executable instructions of playing comprises processor-executable instructions of producing the audio information on a transducer of the telecommunication terminal that is converting the text information to the audio information.

46. A processor-readable medium for providing telephony operations, comprising processor-executable instructions configured:

registering on a switching system by a computer as a telephony endpoint;

establishing a connection with the telephony endpoint by the computer in response to a request from the telephony endpoint received via the switching system;

receiving text information for the telephony endpoint from the switching system by the computer;

translating the received text information to another language by the computer in response to the received text information from the switching system; and transmitting the translated text information to the telephony endpoint.

47. The processor-readable medium of claim 46 wherein the text information is at least one of call status information, TTY information, IM information, or SMS information.

48. The processor-readable medium of claim 47 further comprises processor-executable instructions of displaying translated text information on a visual display of the telephony endpoint.

* * * * *